US010581607B2

(12) United States Patent
Hu et al.

(10) Patent No.: US 10,581,607 B2
(45) Date of Patent: Mar. 3, 2020

(54) PAIRING PROCEDURE

(71) Applicant: ABB Technology Oy, Helsinki (FI)

(72) Inventors: Zhongliang Hu, Espoo (FI); Teemu Tanila, Espoo (FI); Mikko Kohvakka, Espoo (FI)

(73) Assignee: ABB Schweiz AG, Baden (CH)

( * ) Notice: Subject to any disclaimer, the term of this patent is extended or adjusted under 35 U.S.C. 154(b) by 198 days.

(21) Appl. No.: 15/590,869

(22) Filed: May 9, 2017

(65) Prior Publication Data

US 2017/0324559 A1   Nov. 9, 2017

(30) Foreign Application Priority Data

May 9, 2016  (EP) .................................... 16168725

(51) Int. Cl.
*H04L 9/32*       (2006.01)
*H04L 29/06*      (2006.01)
*G06F 21/44*      (2013.01)
*H04W 12/06*      (2009.01)

(52) U.S. Cl.
CPC ........ *H04L 9/3226* (2013.01); *H04L 63/0869* (2013.01); *G06F 21/44* (2013.01); *H04W 12/06* (2013.01)

(58) Field of Classification Search
CPC ... H04L 9/3226; H04L 63/0869; H04L 67/12; H04L 63/083; H04W 12/04; H04W 4/80; H04W 84/18; H04W 12/06; H04W 12/003; G06F 21/44
See application file for complete search history.

(56) References Cited

U.S. PATENT DOCUMENTS

| 6,772,331 | B1* | 8/2004 | Hind ..................... G06F 21/445 713/151 |
| 7,907,901 | B1* | 3/2011 | Kahn .................. H04M 1/7253 455/41.2 |
| 8,059,573 | B2* | 11/2011 | Julian ..................... H04W 4/21 370/312 |
| 8,095,071 | B2* | 1/2012 | Sim ........................ H04W 8/005 455/39 |
| 8,103,247 | B2* | 1/2012 | Ananthanarayanan ..................... H04W 12/06 455/411 |
| 8,213,613 | B2* | 7/2012 | Diehl ..................... H04N 7/163 380/211 |
| 2005/0283614 | A1* | 12/2005 | Hardt .................. H04L 63/0823 713/182 |

(Continued)

OTHER PUBLICATIONS

European Patent Office, European Search Report issued in corresponding Application No. 16168725.6, dated Sep. 14, 2016, 2 pp.

(Continued)

*Primary Examiner* — Cheng-Feng Huang
(74) *Attorney, Agent, or Firm* — Taft Stettinus & Hollister LLP; J. Bruce Schelkopf

(57) ABSTRACT

To automate establishment of an ad hoc connection between a user apparatus and a device, username-password pairs and identifying information-code pairs are maintained in a database server. The user apparatus sends an inquiry identifying information of the device and a username and a password of a user of the user apparatus, and receives in a response a code for establishing the ad hoc connection.

6 Claims, 7 Drawing Sheets

(56) References Cited

U.S. PATENT DOCUMENTS

| | | | |
|---|---|---|---|
| 2008/0134281 A1 | 6/2008 | Shinde et al. | |
| 2009/0260064 A1* | 10/2009 | McDowell | G06F 21/10 726/4 |
| 2010/0043056 A1* | 2/2010 | Ganapathy | H04W 12/06 726/2 |
| 2010/0058064 A1* | 3/2010 | Kirovski | H04L 9/3073 713/176 |
| 2011/0136434 A1 | 6/2011 | Choi | |
| 2012/0254987 A1* | 10/2012 | Ge | H04L 63/0492 726/19 |
| 2012/0297229 A1* | 11/2012 | Desai | H04W 76/14 713/340 |
| 2012/0322376 A1 | 12/2012 | Couse | |
| 2013/0103939 A1* | 4/2013 | Radpour | H04L 9/083 713/152 |
| 2013/0326605 A1* | 12/2013 | Betz | G06F 21/31 726/7 |
| 2014/0273820 A1* | 9/2014 | Narayan | H04W 12/06 455/41.1 |
| 2014/0335823 A1* | 11/2014 | Heredia | H04L 51/38 455/411 |
| 2015/0029942 A1* | 1/2015 | Chen | H04W 4/80 370/329 |
| 2015/0295930 A1* | 10/2015 | Dixon | H04L 63/083 713/181 |
| 2015/0296377 A1* | 10/2015 | Sheu | H04L 63/0869 380/279 |
| 2015/0359022 A1 | 12/2015 | Lau et al. | |
| 2015/0373760 A1 | 12/2015 | Palin et al. | |
| 2016/0164831 A1* | 6/2016 | Kim | H04L 43/08 |
| 2016/0321447 A1* | 11/2016 | Lancioni | H04L 63/0492 |

OTHER PUBLICATIONS

European Patent Office, European Office Action for corresponding EP Application No. 16168725.6, dated Oct. 11, 2018, 9 pages.

* cited by examiner

PAIRING PROCEDURE

RELATED APPLICATIONS

This application claims priority to European Patent Application No. 16168725.6, filed on May 9, 2016, the contents of which is hereby incorporated herein by reference in its entirety.

FIELD

The present invention relates to pairing between wireless devices.

BACKGROUND ART

The evolvement of communication technology, particularly wireless communication technology and end user devices, has enabled versatile communication possibilities. For example, a user near a device may trigger an establishment of a local ad-hoc connection, such as a BLUETOOTH connection, between the device and a mobile device of the local user. Typically, at least when the local ad-hoc connection is established first time, the device and the mobile device go through a pairing procedure for security purposes. The pairing procedure often involves, as a security measure, a user interaction that confirms identities of the device and the mobile device.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide methods, apparatuses, a system and a computer program product for providing a pairing procedure that requires less or no user interaction to confirm the identities without sacrificing security.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

The present invention is applicable to any system that is configured to support ad hoc local connections, the connection using pairing as an access method, or as part of an access method. Pairing is a process in which two devices establish together a connection, typically a BLUETOOTH connection, between the two devices. During pairing a device is typically configured to confirm an identity of a counterpart device before the device is let to connect to the counterpart device. Usually, but not always, the pairing includes that the device and the counterpart device establish a relationship by creating, using the identity of the counterpart device as one input, a shared secret known as a link key.

Figure 1:
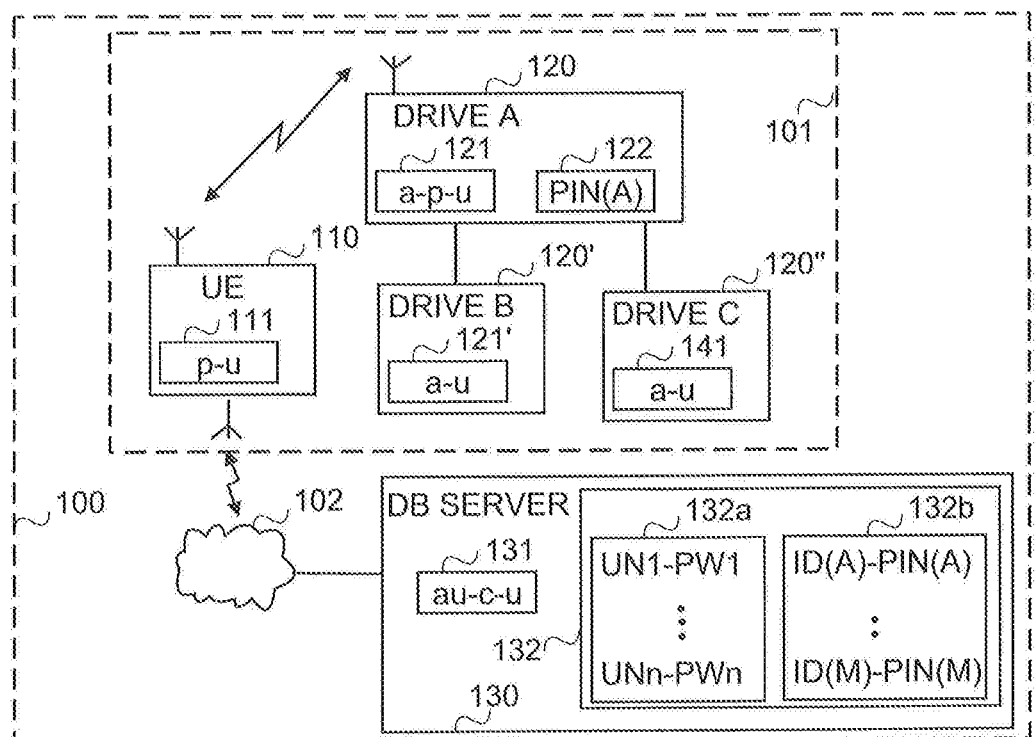
FIGS. 1 and 2 show simplified architectures of systems and block diagrams of some apparatuses according to exemplary embodiments.

An extremely general architecture of an exemplary system 100 is illustrated in FIG. 1. FIG. 1 is a simplified system architecture only showing some elements, functional entities, which are logical units whose implementation may differ from what is shown, and some equipment. It is apparent to a person skilled in the art that the system comprises any number of shown elements, other equipment, other functions and structures that are not illustrated.

In the embodiment illustrated in FIG. 1, the system 100 comprises one or more local connection networks 101 (only one illustrated in FIG. 1). The local connection network may use a so-called short range wireless technology, for example BLUETOOTH, WI-FI, ZIGBEE and/or LI-FI, without restricting the technology providing two-way ad hoc connections to them. The local connection network may be a piconet or a scatternet in an industrial site, for example.

In the illustrated example the local connection network 101 comprises a user apparatus (UE) 110 of a remote user. The user apparatus 110 refers to a portable computing device (equipment), and it may also be referred to as a user terminal, user device, or mobile terminal. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), laptop and/or touch screen computer, tablet (tablet computer), multimedia device and wearable computer (wearable device). In the illustrated example the user apparatus has at least two communications interfaces, depicted by 2 antennas, one to connect to the database server 130 wirelessly over one or more networks 102 and one to connect to the drive 120 over an ad-hoc connection (local connection). For ad-hoc connections requiring pairing the user apparatus 110 comprises a pairing unit (p-u) 111 whose functionality will be described in more detail below. It should be appreciated that the user apparatus 110 is depicted to include 2 antennas only for the sake of clarity. The number of reception and/or transmission antennas, or other communication interfaces, may naturally vary according to a current implementation.

At the simplest, an ad hoc connection requires in addition to the user apparatus 110 in the local connection network 101 one counterpart device with which to establish the ad hoc connection, the counterpart device being any kind of a device configured to implement a pairing related functionality described below. In the illustrated example of FIG. 1, the local connection network 101 is configured to support a "trust network", in which communication between the user apparatus and a trusting device passes via a trusted device.

The trust may be created by using key-based encryption communication, such as public key infrastructure or shared secret infrastructure, for example. In other words, in the example illustrated in FIG. 1, a drive A 120 represents a trusted device (counterpart device) with which the user apparatus may establish a two-way ad-hoc connection and a drive B 120' and a drive C 120" trust the drive A, i.e. are trusting devices. Hence, in the example of FIG. 1, the drive A comprises for ad-hoc connections in a memory 122 a PIN code used in pairing to confirm the identity and an access and pairing unit (a-p-u) 121 that is in addition to ad-hoc connection configured to establish connections to trusting devices. Further, in the illustrated example it is assumed that the trusting devices are not configured to establish ad-hoc connections. Therefore the trusting devices, i.e. the drive B 120' and the drive C 120" in turn comprises an access unit (a-u) configured to provide access to the user apparatus via the trusted device, the drive A 120. However, it should be appreciated that trusting devices may also be configured to establish ad-hoc connections.

The database server 130 refers herein to a combination of a data storage (database) and a data management system. The data storage may be any kind of conventional or future data repository, including distributed and centralized storing of data, a cloud-based storage in a cloud environment, managed by any suitable management system. The implementation of the data storage, the manner how data is stored, retrieved and updated are irrelevant to the invention, and therefore not described in detail here. Further, it should be appreciated that the location of the database server 130 is irrelevant to the invention. The database server 130 may locate in a remote service center, or in the same location where the drives 120, 120', 120" are, for example.

The database server 130 is configured to support the pairing. For that purpose the database server 130 comprises an authentication and code unit (au-c-u) 131 whose functionality will be described in more detail below, and a data storage 132 comprising username-password pairs 132a, or corresponding associations associating a username (UN) with a password (PW), and identifier-PIN code pairs 132b, or corresponding associations associating an identifying information (ID) with a PIN code (PIN). It should be appreciated that although in the above example the data storage comprises only one set of username-password pairs and identifier-PIN code pairs that need not to be the case. The data storage may comprise several sets of such pairs, associating a set of username-password pairs to one or more sets of identifier-PIN code pairs. With such a structure, it is easier to control which user's (or user apparatuses) will have access to certain devices, like drives in a location A and/or drives in a location B.

The username and the password may be any kind of a string of characters, as is commonly known in the art. Depending on an implementation, the username-password pair may be defined only for access to the identifier-PIN code pairs, or they may be defined for a certain application, such as a remote maintenance application running in the user apparatus.

The identifier, or any corresponding identifying information identifies the counterpart devices, i.e. in the illustrated example the drives. The identifying information for a device may comprise its unique address, a device name, or a kind of nickname, i.e. a user friendly name given to the device, such as a BLUETOOTH name, possibly combined with its site name, for example, to create a unique identifier. The identifying information, called below mere "identifier", may be any kind of a string of characters, as is commonly known in the art.

The PIN code covers herein any code or corresponding information, like a password in BLUETOOTH password pairing, needed in the pairing procedure. For example, in BLUETOOTH any 16-byte UTF-8 string may be used as a PIN code. In other words, depending on the counterpart device and the used pairing algorithm, in BLUETOOTH pairing the PIN code may contain numeric input in length one to 16 digits, like "1234" or "123456", or any character string in length one to 16 digits. The PIN code may be a fixed PIN code hard-coded into the device, or a non-fixed PIN code updated at certain intervals, both to the device and to the database server. For example, the PIN code may be updated each time a connection is establish, or the PIN code may be updated randomly. For example, a pairing seed may be used for creating updated PIN codes. It should be appreciated that he type of the PIN code bears no significance to the invention.

The one or more networks 102 (communications networks) providing information exchange at least between the user apparatus and the database server 130, possibly also between the database server and one or more counter-devices (the drives 120, 120', 120") may comprise one or more wireless networks, wherein a wireless network may be based on any mobile system, such as GSM, GPRS, LTE, 4G, 5G and beyond, or a wireless local area network, such as WI-FI. Further, the one or more networks 102 may comprise one or more fixed networks and internet.

The local connection network 101 in the illustrated example of FIG. 1 may be used by the user apparatus for remote maintenance purposes, to adjust or acquire parameters from the drives 120, 120', 120", for example, in which case the drives 120, 120', 120" represent devices whose operations and/or service and/or maintenance may be taken care remotely via one or more communication interfaces and/or modules (not illustrated in FIG. 1) that may be integral parts of a drive and/or external to the drive. Other examples of such devices include frequency converters, AC/DC modules, DC/AC modules, programmable logic controllers, switches, motion controllers or motion drives, servo motors, soft starters, robots, cars, and heavy equipment, etc., just to list only some examples. In other words, the user apparatus (UE) 110 of a remote user may represent visiting equipment, and the drive A 120, drive B 120' and drive C 120" represent permanent equipment. The permanent equipment means herein equipment that is intended to locate in the industrial site a long time, whereas the visiting equipment means equipment that is intended to visit the industrial site temporarily. However, it should be appreciated that the user apparatus 110 may be permanent equipment as well, or the local connection network may comprise devices that all are visiting equipment.

Figure 2:
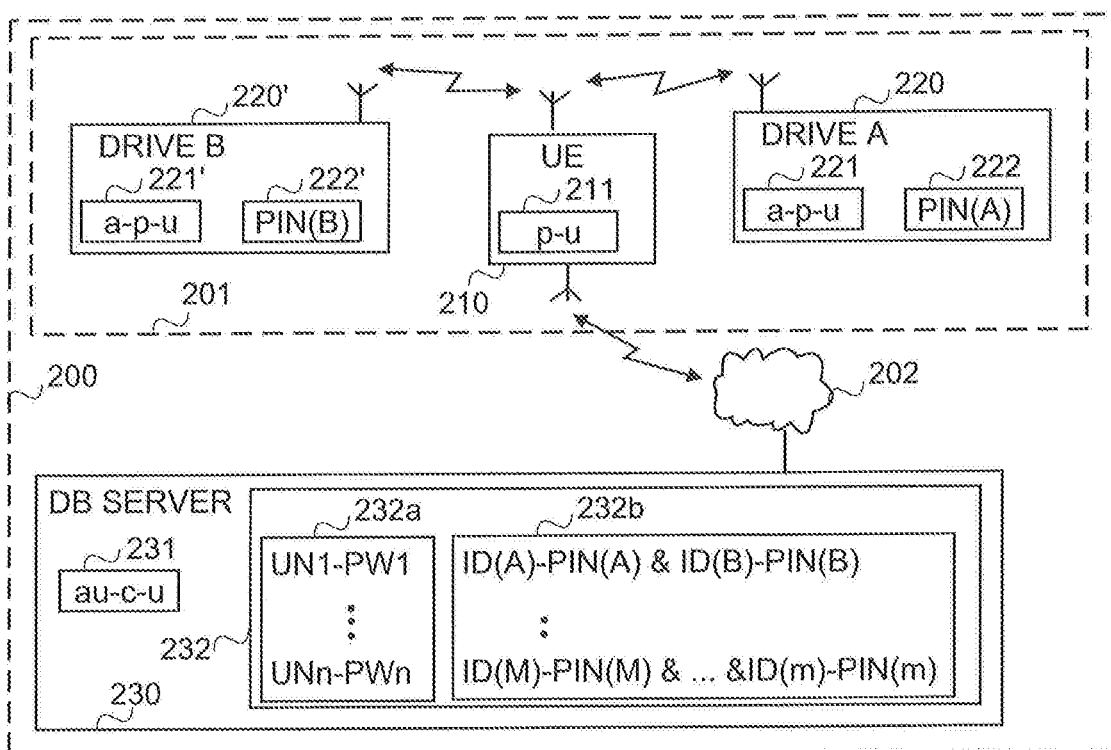

Another extremely general architecture of an exemplary system 200 is illustrated in FIG. 2. FIG. 2 is also a simplified system architecture only showing some elements, functional entities, which are logical units whose implementation may differ from what is shown, and some equipment. It is apparent to a person skilled in the art that the system comprises any number of shown elements, other equipment, other functions and structures that are not illustrated.

In the example of FIG. 2, the user apparatus 220 is connected over one or more networks 202, as described above, to the database server 230. The embodiment illustrated in FIG. 2 differs from the embodiment illustrated in FIG. 1 for example in that respect that the local connection network 201 is not based on trust. More precisely, the user apparatus (UE) 210 may establish, and needs to establish if a connection is needed, a two-way ad hoc connection with each of one or more counterpart devices, the drive A 220 and the drive B 220' in the example illustrated in FIG. 2, in the local connection network 201. For that purpose the user apparatus 210 comprises the pairing unit 211, and each drive that is configured to establish an ad hoc connection comprises in its memory 222, 222' a PIN code used in pairing, and an access and pairing unit (a-p-u) 221.

The other difference is that in the database server 230, the data storage 232 comprises the username-password pairs 232a, as in the example of FIG. 1, but the identifier-PIN code pairs 232b are grouped to groups, a group comprising one or more identifier-PIN code pairs. There are no restrictions how the groups are formed, but naturally a group should contain identifier-PIN code pairs of devices that physically locate at least in the same site, or within a local connection range. The grouping facilitates dynamic installation of drives; it suffices to add a drive, or more precisely, its information/data to a proper group in the database, the user apparatuses having granted access to the earlier existing drive need not to be updated correspondingly. The grouping affects to the functionality of then authentication and code unit (au-c-u) 231, as will be described in more detail below.

It should be appreciated that in further embodiments, the local connection network based on trust (trust network) may be associated with a database server in which the identifier-PIN code pairs are grouped to groups, and correspondingly, the local connection network that is not based on trust may be associated with a database server having identifier-PIN code pairs not grouped. Further, a local connection network may comprise one or more trusted drives, and one or more trusting drives, and one or more "non-trust based drives", i.e. the local connection network is a combination of those illustrated in FIGS. 1 and 2, and associated with a database server described with FIG. 1 or with a database server described with FIG. 2.

Different pairing related procedures are described below. In the examples it is assumed that the two-way ad hoc connection is a BLUETOOTH connection established between a user apparatus and one or more counterparts, called mere devices below, without restricting the examples to such an ad hoc connection. Although not illustrated in examples, depending on the selected pairing procedure, the pairing may contain additional steps. However, they are not illustrated herein. For example, instead of PIN code, Secure Simple Pairing with passkey entry may be used, the passkey being a kind of a PIN code.

Figure 3:
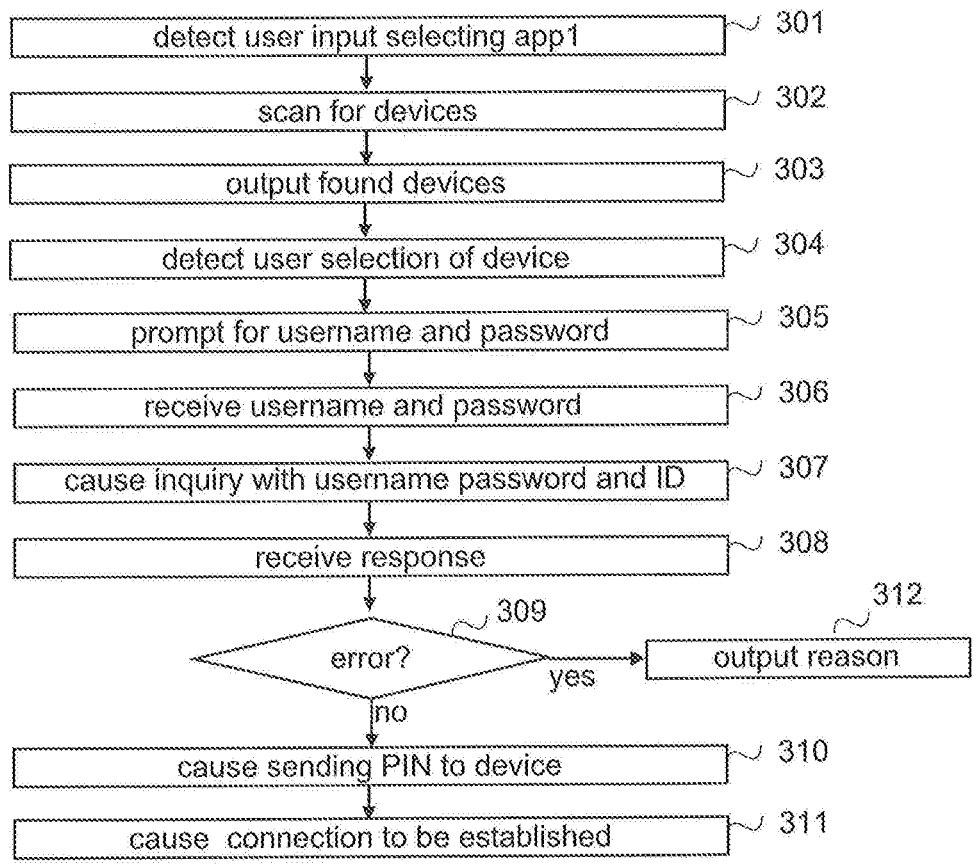
FIGS. 3 to 11 are flow charts illustrating exemplary functionalities.
Figure 4:
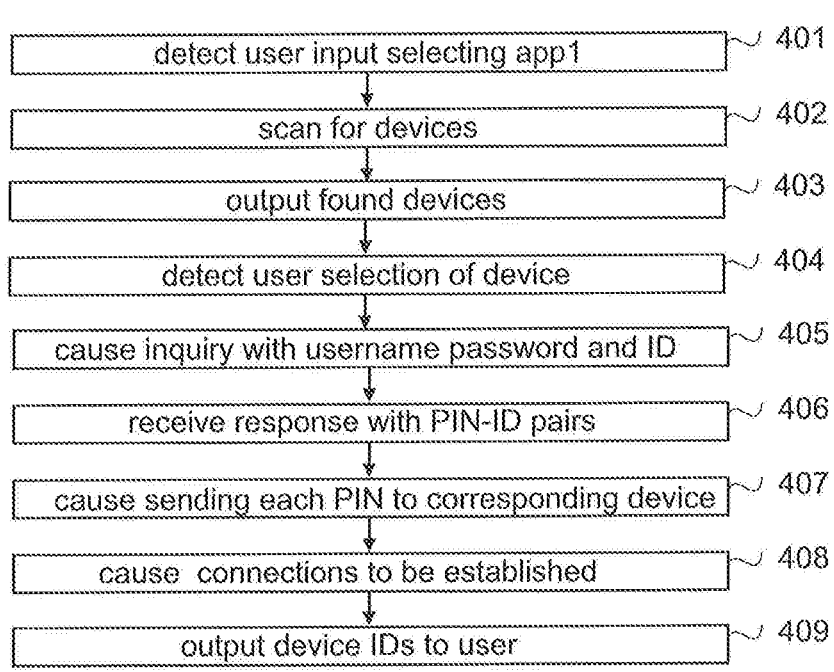
Figure 5:
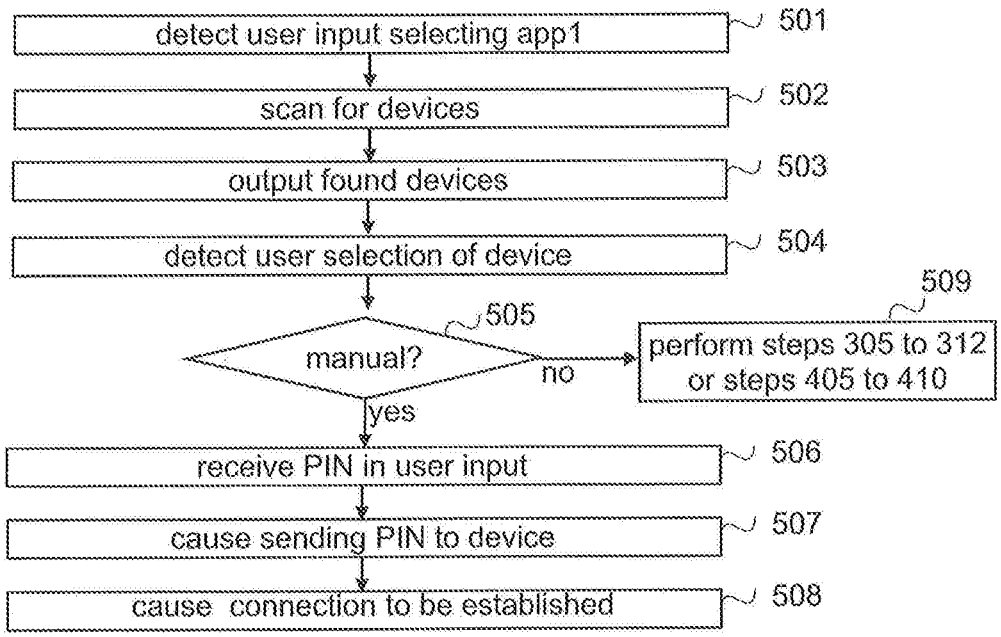

FIGS. 3 to 5 illustrate different pairing related functionalities of the user apparatus, or more precisely, the pairing unit. In the example of FIG. 3 it is assumed that the database server comprises non-grouped identifier-PIN code pairs, and in the example of FIG. 4 it is assumed that the database server comprises grouped identifier-PIN code pairs. In the example of FIG. 5 is in turn assumed that the user is given a choice whether to perform the pairing manually or automatically, whereas in the examples of FIGS. 3 and 4 the pairing is performed without user involvement to the actual pairing process.

Referring to FIG. 3, when a user input selecting a specific application (app1) is detected in step 301, devices supporting BLUETOOTH and being in a discoverable mode are scanned in step 302, and once found, outputted in step 303 to a user interface so that a user of the user apparatus can see (and/or hear, and/or feel if touch-based user interface is used) the found devices. The specific application may be a dedicated application for establishing BLUETOOTH connections, or an application including establishment of BLUETOOTH connections, for example a remote maintenance application for mobile devices.

In the illustrated example, once a user input indicating a selection of one of the one or more devices found by scanning is detected in step 304, the user is prompted to provide a username and a password in step 305. Further, in the illustrated example it is assumed that the username and the password is received in step 306. Once they have been received, an inquiry comprising the username and the password, as well as sending an identifier (ID) of the selected device to the database server is caused in step 307. The identifier is received in "discover me" information of the selected device, and the address of the database server is preferably part of the specific application configuration.

When a response from the database server is received in step 308, and it does not contain an error (step 309), it contains a PIN code whose sending, for the pairing process, to the device selected in step 304 is caused in step 310. Since the received PIN code should be the same PIN code that is stored to the memory of the device, the pairing ends up to a connection being established in step 311.

If the response from the database server is an error (step 309), a reason for the rejection is outputted in step 312. The reason may be that no corresponding username-password pair was found, or that the user (the username-password pair) is not allowed to have access to the device.

As can be seen from the above, establishing the ad hoc connection requires minimum user input, thereby making the process less vulnerable to human errors, for example in inputting different information, like an identifier or a PIN code. Further, it is easy for the user to use. In addition, the user does not need to be near the device to see the PIN code, and as a matter of fact, there is no need to the PIN code being exposed (readable, for example) in or by the device. This in turns increases the safety. A further measure increasing the safety is to require the username-password combination which in turn takes care that only authenticated or registered users, with their user apparatuses, will be able to establish the ad hoc connection to the device.

Referring to FIG. 4, steps 401 to 404 correspond to steps 301 to 304, and are not repeated in vain herein. In the example of FIG. 4, it is assumed that the application selected in step 401 either requires a username and a password to start to run, or the application can be selected only after the username and the password are known. Therefore the username and the password are not asked from the user, but the already known username and password, that may be in a runtime memory, for example, are used, and an inquiry comprising the username and the password, as well as sending an identifier (ID) of the selected device to the database server is caused in step 405.

Further, in the illustrated example of FIG. 4 it is assumed, for the sake of clarity that the response does not contain an error (if it would, the process described in steps 309 and 312 above would be performed). Hence, the response received in step 406 comprises one or more PIN code-identifier pairs. For pairing to each device belonging to the group, sending each PIN code to a corresponding device is caused in step 407, determined by the identifier part of the pair, and establishing corresponding connections are caused in step 408, as described above. Further, in the illustrated example, the devices with which the connection has been established are outputted in step 409 via a user interface to the user so that the user know with which devices the user apparatus is connected to.

Referring to FIG. 5, steps 501 to 504 correspond to steps 301 to 304, and are not repeated in vain herein. In the example illustrated in FIG. 5, once the user input selecting a device with which to establish the ad hoc connection, the BLUETOOTH connection, the user is provided (step 505) with an option to select, whether a manual or automatic pairing is to be performed. It may also be that if the automatic pairing fails, the user may try or may be prompted to try the manual pairing. If the pairing is to be performed manually, a PIN code is received in step 506 as a user input once the user has learned it from a user interface or a display of the device, or otherwise exposed by the device. For example, the user may have to log into a panel (user interface) to see the PIN code and/or the PIN code may be behind a pass code in the panel, so that only those knowing the pass code are able to see the PIN code. After receiving the PIN code as user input, sending of the PIN code is caused in step 507 to the device for pairing purposes, and the connection establishment continues in step 508.

If instead of the manual pairing the automatic pairing is selected (step 505), the process continues either from step 305 of FIG. 3 or from step 405 of FIG. 4. In other words, one of the automatic processes described above is performed (with the addition of selection manual or not).

To provide both manual pairing and automatic pairing ensures that a BLUETOOTH connection may be established, with the prior art security level, when the user apparatus, or the user does not have any credentials (username-password pair) in the remote database, and retrieval of a PIN code will not succeed, or when there is a network failure/malfunction so that no connection can be established for retrieval of the PIN code.

Figure 6:
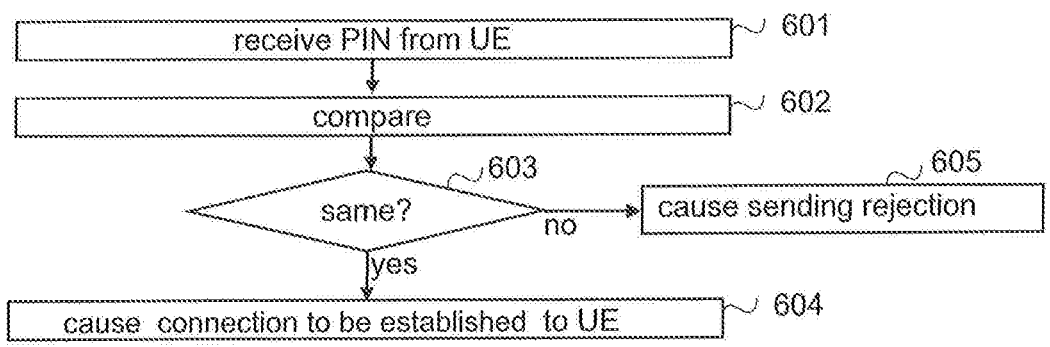
Figure 7:
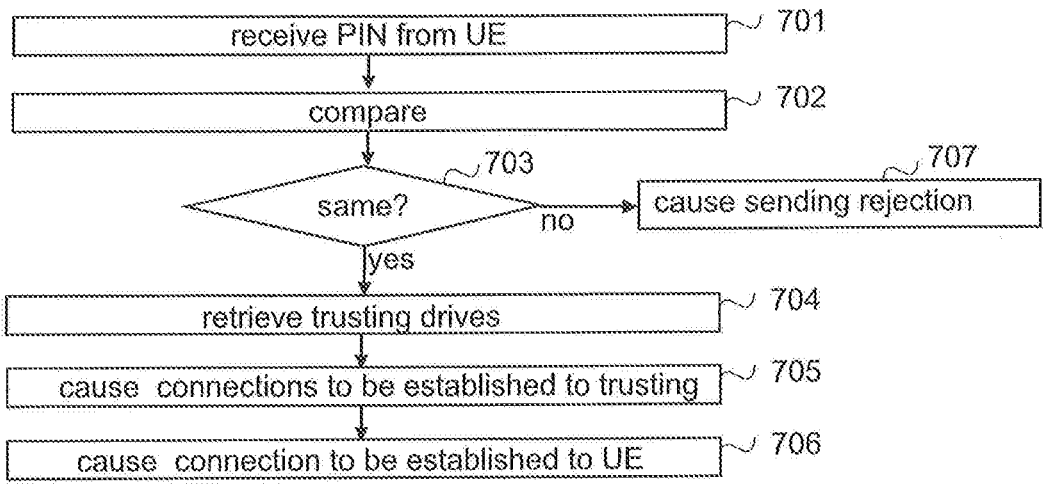

FIGS. 6 and 7 illustrate different pairing related functionalities of the counterpart device, or more precisely, the access and pairing unit in the device. In the example of FIG. 6 it is assumed that the device is for a local connection network not based on trust, and in the example of FIG. 7 the device is a trusted device for a trust based network.

Referring to FIG. 6, once a PIN code is received in step 601 from a user apparatus (UE), it is compared in step 602 with a PIN code stored to the memory of the device for pairing purposes. If they are the same (step 603), the pairing procedure continues and establishing the connection is caused in step 604. If the received PIN code and the PIN code in the memory are not the same (step 603), sending a rejection is caused in step 605 and no BLUETOOTH connection is established.

Referring to FIG. 7, steps 701 to 703 correspond to steps 601 to 603, and step 707 corresponds to step 605, and they are not repeated in vain herein. Once it has been detected that the received PIN code is the same as the one stored to the memory (step 703), information on trusting devices is retrieved (or the trusting devices are determined) in step 704, and then establishing a BLUETOOTH connection to each trusting device is caused in step 705. Once they are established, or simultaneously, establishing a BLUETOOTH connection between the user apparatus and the device is caused in step 706.

Figure 8:
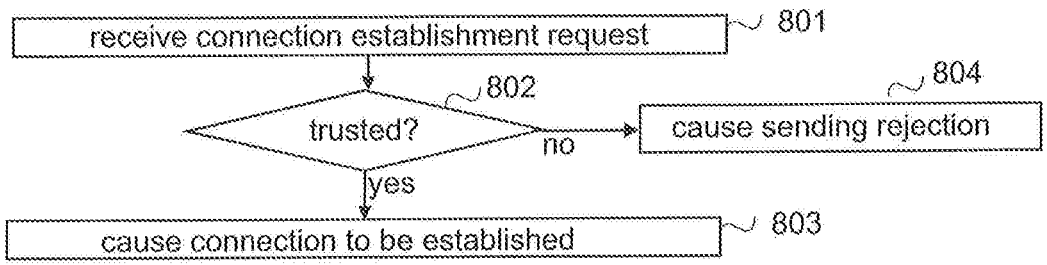

FIG. 8 illustrates an exemplified functionality of a trusting device, or more precisely of an access unit, when a connection is established.

Referring to FIG. 8, once a connection establishment from a device is received in step 801, it is checked in step 802, whether or not the device wherefrom the connection establishment is received, is a trusted device. If it is the trusted device, establishing the connection is caused in step 803. If the device is not a trusted device (step 802), rejecting the connection establishment is caused in step 804.

Figure 9:
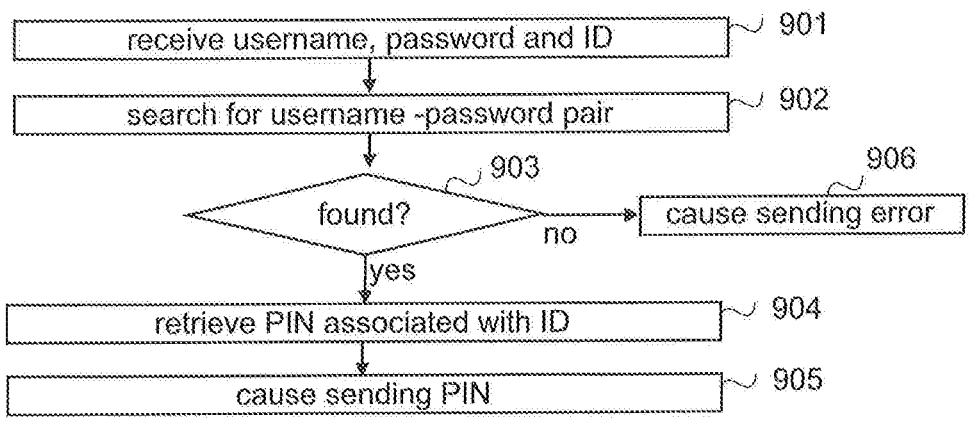
Figure 10:
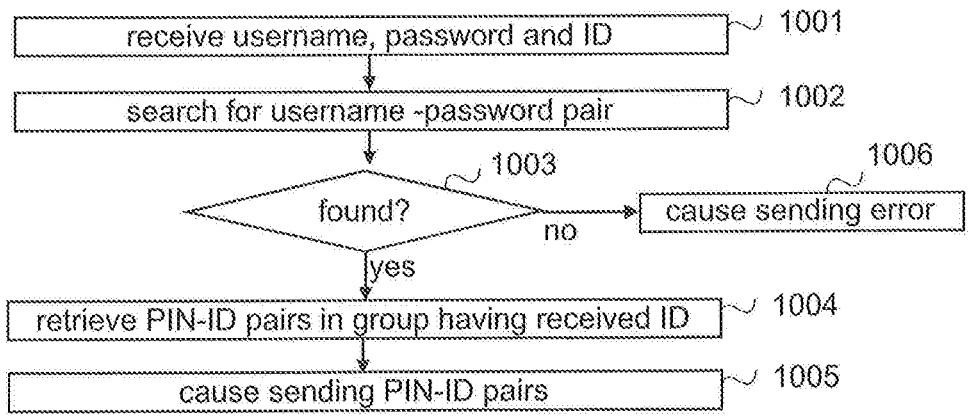
Figure 11:
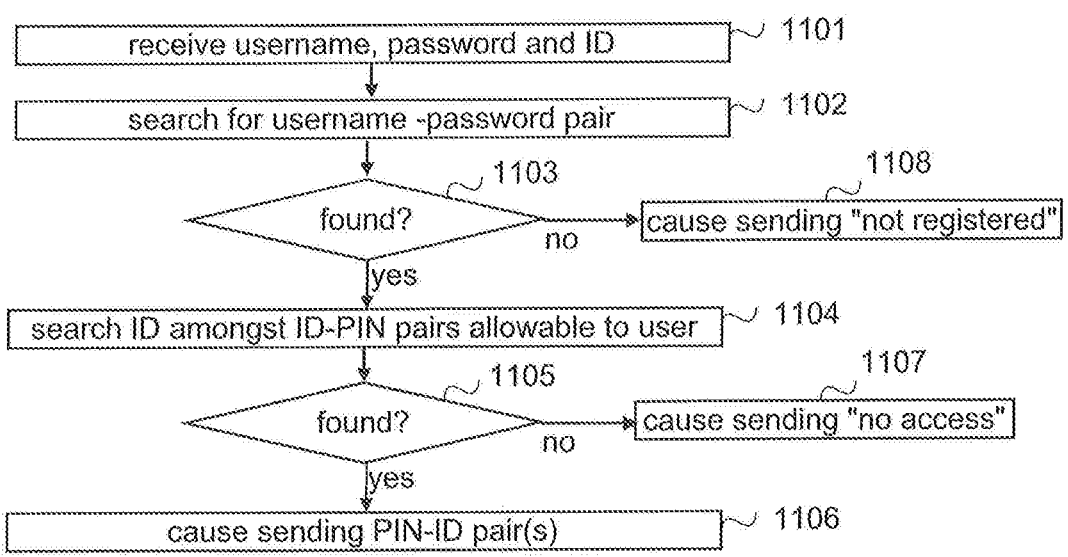

FIGS. 9 to 11 illustrate different information retrieval related functionalities of the database server, or more precisely, the authorizing and code unit. In the example illustrated in FIG. 9, the database comprises the identifier-PIN code pairs without grouping, in the example illustrated in FIG. 10 the database comprises the grouped identifier-PIN code pairs. In the examples it is assumed that the database (data storage) comprises for the identifier a PIN code for a sake of clarity. Naturally, if an inquiry with an identifier that is not stored to the database, or at least stored with a PIN code, is received, an error is sent as a response.

Referring to FIG. 9, when a username, password and identifier is received in step 901 in an inquiry, the database server (the authorizing and code unit) searches for a username-password pair in the database that correspond to the received username and password. If such a pair is found (step 903), a PIN code is retrieved in step 904 from the identifier-PIN code pairs in the database using the identifier as a retrieval key. Then the sending of the PIN code is caused in step 905 in a response to the inquiry.

If no corresponding username-password pair is found (step 903), sending an error is caused in step 906 in a response to the inquiry.

Referring to FIG. 10, steps 1001, 1002, 1003 and 1006 correspond to steps 901, 902, 903 and 906, and they are not repeated in vain herein. If a username-password pair corresponding to the received username and password pair is found (step 1003), a group of identifier-PIN code pairs is retrieved in step 1004 from the identifier-PIN code pair groups in the database using the received identifier as a retrieval key. In other words, a group comprising the identifier is retrieved. For example, referring to the example illustrated in FIG. 2, if the identifier is ID(B), the group "ID(A)-PIN(A)&ID(B)-PIN(B)" is retrieved from the database. Then the sending of the one or more identifier-PIN code pairs is caused in step 1005 in a response to the inquiry.

Referring to FIG. 11, steps 1101, 1102 and 1103 correspond to steps 901, 902 and 903, and they are not repeated in vain herein.

If a corresponding username-password pair is found (step 1103), an identifier corresponding to the received identifier is search for in step 1104 amongst those identifier-PIN code pairs that are indicated as allowed to the user, identified by the username-password pair. If a corresponding identifier is found (step 1105), depending whether or not the grouped pairs are used, functionality corresponding to steps 1004 and 1005, or to steps 904 and 905 is performed in step 1106.

If a corresponding identifier is not found amongst the allowed identifier-PIN code pairs (step 1105), sending an error report informing that the user has no access to the device is caused in step 1107.

If a corresponding username-password pair is not found (step 1103), sending an error report informing that the user is not registered, for example, is caused in step 1108.

Figure 12:
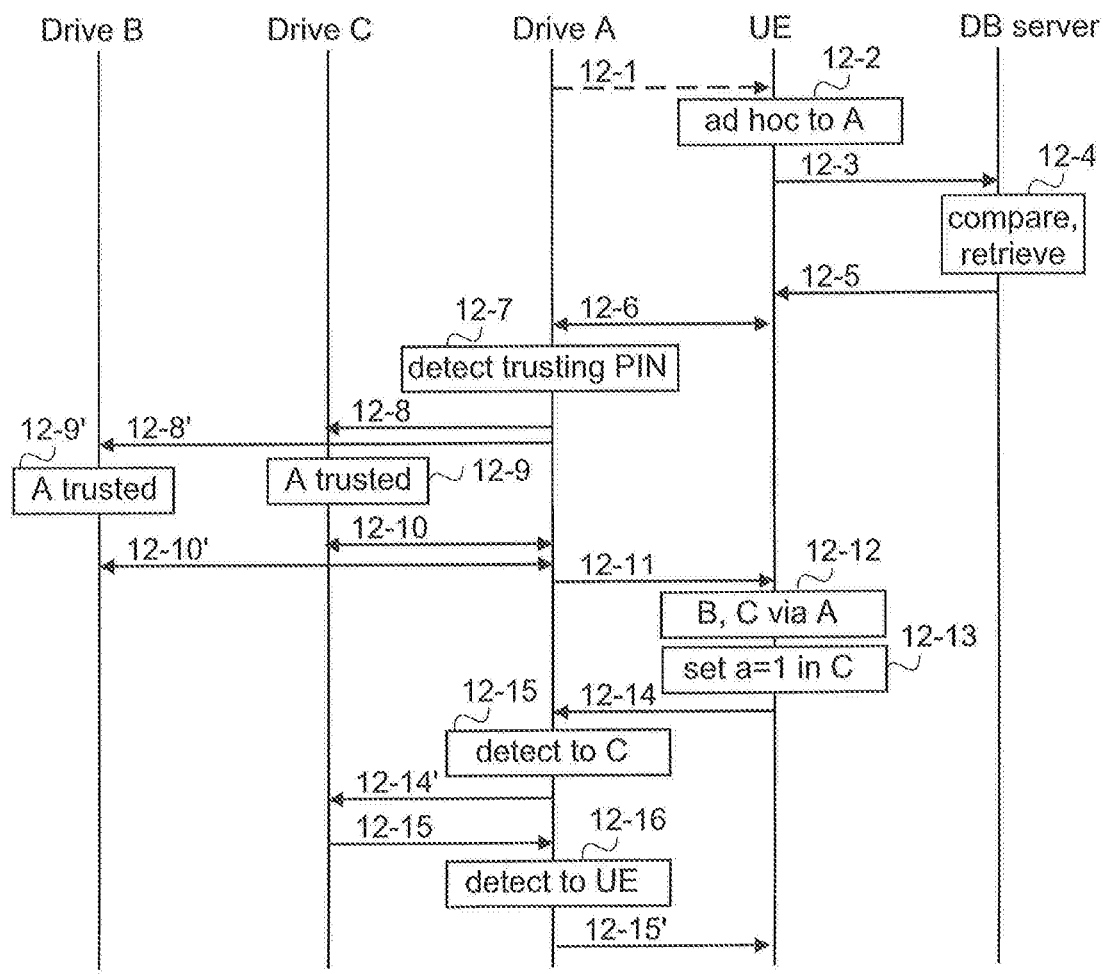
FIGS. 12 and 13 illustrate exemplary information exchanges.
Figure 13:
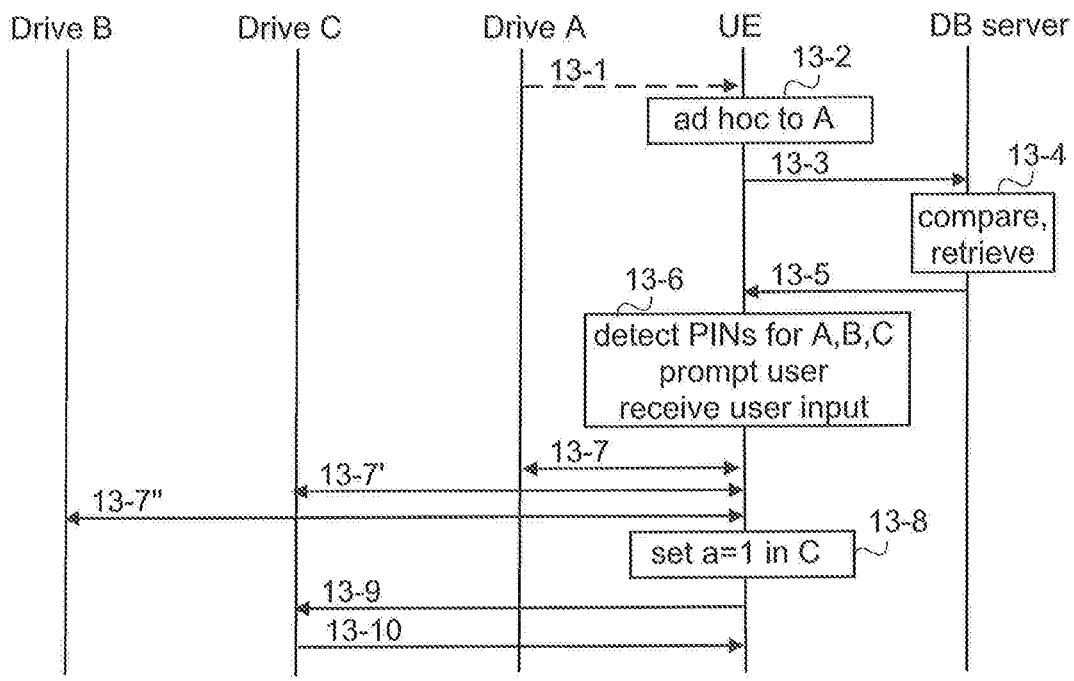

FIGS. 12 and 13 illustrated different information exchanges, FIG. 12 in a trust network, and FIG. 13 when the grouping is used. In both examples it is assumed that the username-password is in a runtime memory of the user apparatus.

Referring to FIG. 12, in the example it is assumed that the drive A is in discoverable mode, ready to be paired, and broadcasts a wireless signal (message 12-1) that allows it to be detected, i.e. captured, by other BLUETOOTH-enabled devices, the broadcast containing the identifier of the drive A. Further, it is assumed that the drive A may have two PIN codes: one for manual pairing and one for automatic pairing, the PIN code for automatic pairing being associable with trusting devices, the PIN code for manual pairing providing access only to the drive A. It should be appreciated that the drive A may have one PIN code, or several PIN codes.

The user apparatus (UE) is in the scanning mode, detects the drive A, and receives in point 12-2 as user instructions to connect to the drive A over the BLUETOOTH connection. Depending on an implementation, the user apparatus may trigger the connection establishment also without any specific user instruction, once the user apparatus has detected in the scanning mode the drive A. In other words, an ad hoc connection is to be established. Therefore the user apparatus sends in message 12-3 to the database server (DB server) the identifier, a username and a password. The database server performs in point 12-4 the username-password comparison, and PIN code retrieval, as described above with FIGS. 9 to 11, and sends in message 12-5 at least the PIN code to the user apparatus. The user apparatus performs the pairing (one or more messages 12-6 between the user apparatus and the drive A) by sending the PIN code received in message 12-5 to the drive A, and finishes the pairing. Once the pairing is finished, the drive A detects that for the PIN code used in the pairing, trusting devices have been determined, and therefore triggers connection establishment (messages 12-8, 12-8') to the trusting devices, which in the example are the drive B and the drive C. The drive B and the drive C each detects in points 12-9', 12-9 that the connection establishment is from a drive, the drive A, that is a trusted drive. Therefore the connections are established (messages 12-10, 12-10'), and the drive A sends in message 12-11 to the user apparatus information on the drives accessible via the drive A. The information is outputted in point 12-12 via a user interface to the user. Assuming that the drive A is the master device in a piconet, access to the master device provides access to other devices in the piconet, without any further user input. However, it should be appreciated that the connection between the drive A and the drive B and/or between the drive A and the drive C does not need to be a BLUETOOTH connection, the connection may be any possible connection. Further, although not described in detail herein, the information sent over the connection may be encrypted information, decrypted in the receiving apparatus. Further, the information exchange, including establishment of the connections, between the drives can use any current or future way, the invention does not affect to the information exchange. For example, the information exchange may be implemented scatternet-mechanism like, as BLUETOOTH hop-by-hop, point-to-point, as a routing layer information exchange over the BLUETOOTH layer, receiver address or identifier may be in the message header, or in the payload, etc. Therefore information exchange is described in a very generic level, and there is no need to describe the information exchange in more detail.

In the illustrated example it is then detected in point 12-13 that, as a remote maintenance function, a parameter "a" is to be set to value 1 in the drive C. Therefore message 12-14, comprising the information (set a=1) and indicating the drive C as a recipient is sent to the drive A. The drive A detects in point 12-15 that the message is for the drive C, and therefore sends message 12-14' to the drive C, which performs the instructed settings (not illustrated), and sends an acknowledgement (message 12-5) to the drive A. The drive A detects in point 12-16 that message 12-5 is to the user apparatus, and sends message 12-5' to the user apparatus.

Referring to FIG. 13, the functionality illustrated from message 13-1 to message 13-5 corresponds to the one described above as functionality form message 12-1 to message 12-5, with the exception that message 13-5 contains more than one identifier-PIN code pairs, and therefore the functionality from message 13-1 to message 13-5 is not described herein in more detail.

The user apparatus (UE) detects in point 13-6 that message 13-5 contains three identifier-PIN code pairs, i.e. a PIN code for the drive A, a PIN code for the drive B, and a PIN code for the drive C, each with corresponding identifier. In the illustrated example, the user apparatus is configured to ask the user a permission for pairing. Therefore, in the illustrated example, the user apparatus prompts in point 13-6 the user to select drives whereto pair by outputting the three identifiers, and receives, in point 13-6, as user input instructions to pair to each of the drives. Naturally the user may have selected only some of the drives. After that the user apparatus performs pairing to the drives A, B, and C, using in pairing (messages 13-7) with the drive A the PIN code for the drive A, in pairing (messages 13-7") with the drive B the PIN code for the drive B, in pairing (messages 13-7') with the drive C the PIN code for the drive C, and once the BLUETOOTH connections are established, the user apparatus outputs in point 13-8 information on the connections so that the user is aware of the drives the user apparatus has connections. As can be seen from the example, the grouping provides a single point of access to manage pairing for a group of devices. Naturally, the user apparatus may be configured to perform the pairing to the drives A, B, and C automatically, i.e. without asking the user a permission to pair.

In the illustrated example it is then detected in point 13-9 that, as a remote maintenance function, a parameter "a" is to be set to value 1 in the drive C. Therefore message 13-10, comprising the information (set a=1) is sent to the drive C. The drive C performs the instructed settings (not illustrated), and sends an acknowledgement (message 13-11) to the user apparatus.

As is evident from the above examples, the automatic pairing provides easier establishment of an ad hoc connection since no user interaction is required for entering the PIN code and increases security since only authorized users can obtain the PIN code needed for the ad hoc connection.

The steps, points, related functions, and information exchanges described above by means of FIGS. 3 to 13 are in no absolute chronological order, and some of them may be performed simultaneously or in an order differing from the given one. For example, in an implementation based on FIG. 12, if the drive A would have only one PIN code and each time connections to trusting devices would be established or allowed, the functionality described by message 12-8 to 12-10' and in points 12-9, 12-9' may be performed while the two-way ad hoc connection is established. Other functions can also be executed between them or within them, and other information may be sent. Some of the steps or points or part of the steps or points or one or more pieces of information can also be left out or replaced by a corresponding step, point or part of the step, point or one or more pieces of information. For example, it is possible to skip over the authentication of the user, and retrieve, by sending a mere identifier, a corresponding PIN code, or a group of PIN codes, if no access restrictions apply. Other examples include that in an implementation based on FIG. 12, if the drive A would have only one PIN code, point 12-7 may be skipped, and the connections between the drive A and the drive B, and between the drive A and the drive C may be a kind of permanent connections, established earlier than the establishment of the two-way ad hoc connection between the user apparatus and the drive A.

The techniques and methods described herein may be implemented by various means so that a user apparatus/terminal device, its counterpart device and/or a server device/a database server configured to support pairing based on at least partly on what is disclosed above with any of FIGS. 1 to 13, including implementing one or more functions/operations of a corresponding terminal device and/or its counterpart device and/or a server device described above with an embodiment/example, for example by means of any of FIGS. 3 to 13, comprises not only prior art means, but also means for implementing the one or more functions/operations of a corresponding functionality described with an embodiment, for example by means of any of FIGS. 3 to 13, and it or they may comprise separate means for each separate function/operation, or means may be configured to perform two or more functions/operations. For example, one or more of the means and/or the pairing unit and/or the access and pairing unit and/or the access unit and/or the authentication and code unit described above may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 3 to 13, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 14:
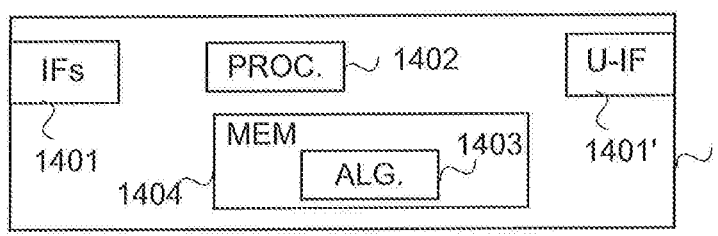
FIGS. 14 to 16 are block diagram of exemplary apparatuses.

FIG. 14 provides an apparatus according to some embodiments of the invention. FIG. 14 illustrates an apparatus configured to carry out the functions described above in connection with the user apparatus/terminal device. Each apparatus 1400 may comprise one or more communication control circuitry, such as at least one processor 1402, and at least one memory 1404, including one or more algorithms 1403, such as a computer program code (software) wherein the at least one memory and the computer program code (software) are configured, with the at least one processor, to cause the apparatus to carry out any one of the exemplified functionalities of the user apparatus. The apparatus may further comprise different communication interfaces 1401 and one or more user interfaces 1401'.

Referring to FIG. 14, at least one of the communication control circuitries in the apparatus 1400 is configured to provide the pairing unit, or any corresponding sub-unit, and to carry out functionalities, described above by means of any of FIGS. 3 to 13, by one or more circuitries.

Figure 15:
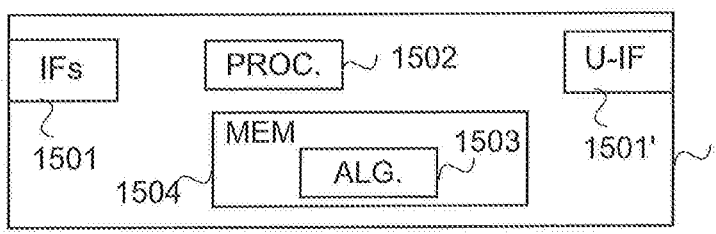

FIG. 15 provides an apparatus according to some embodiments of the invention. FIG. 15 illustrates an apparatus configured to carry out the functions described above in connection with the counterpart device (the drive). Each apparatus 1500 may comprise one or more communication control circuitry, such as at least one processor 1502, and at least one memory 1504, including one or more algorithms 1503, such as a computer program code (software) wherein the at least one memory and the computer program code (software) are configured, with the at least one processor, to cause the apparatus to carry out any one of the exemplified functionalities of the counter-part device. The apparatus may further comprise different communication interfaces 1501 and zero or more user interfaces 1501'.

Referring to FIG. 15, at least one of the communication control circuitries in the apparatus 1500 is configured to provide the access and pairing unit and/or the access unit, or any corresponding sub-unit, and to carry out functionalities, described above by means of any of FIGS. 3 to 13, by one or more circuitries.

Figure 16:
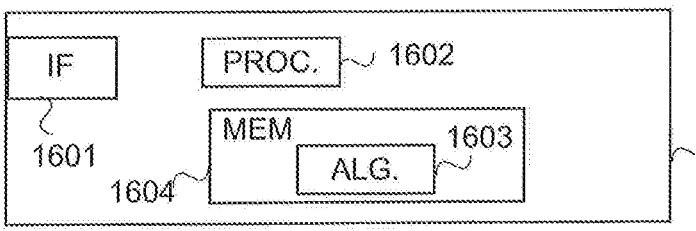

FIG. 16 provides an apparatus according to some embodiments of the invention. FIG. 16 illustrates an apparatus configured to carry out the functions described above in connection with the database server. Each apparatus 1600 may comprise one or more communication control circuitry, such as at least one processor 1602, and at least one memory 1604, including one or more algorithms 1603, such as a computer program code (software) wherein the at least one memory and the computer program code (software) are configured, with the at least one processor, to cause the apparatus to carry out any one of the exemplified functionalities of the server (data base server). The memory 1604 may comprise a database for storing different pairs of information, as described above, for example with FIG. 1 and/or FIG. 2. The apparatus may further comprise different communication interfaces 1601.

Referring to FIG. 16, at least one of the communication control circuitries in the apparatus 1600 is configured to provide the authentication and code unit or any corresponding sub-unit, and to carry out functionalities, described above by means of any of FIGS. 3 to 13, by one or more circuitries.

The memory 1404, 1504, 1604 or part of it may be implemented using any suitable data storage technology, such as semiconductor based memory devices, flash memory, magnetic memory devices and systems, optical memory devices and systems, fixed memory and removable memory.

The one or more communication interfaces (TX/RX) 1401, 1501, 1601 may comprise hardware and/or software for realizing communication connectivity according to one or more communication protocols. The communication interface may provide the apparatus with communication capabilities to communicate over a local connection and/or local connections and/or in a cellular communication system and/or in a fixed network, and enable communication between different apparatuses. The communication interface 1401, 1501, 1601 may comprise standard well-known components such as an amplifier, filter, frequency-converter, (de)modulator, and encoder/decoder circuitries and one or more antennas. The communication interfaces 1401, 1501, 1601 may comprise radio interface components and/or other wireless interface components providing the apparatus with wireless communication capability.

A user interface 1401', 1501' may be any kind of a user interface, for example a screen, microphone and one or more loudspeakers for interaction with the user.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a user apparatus or a similar integrated circuit in a server, or in a counterpart device.

In an embodiment, the at least one processor, the memory, and the computer program code form processing means or comprises one or more computer program code portions for carrying out one or more operations according to any one of the embodiments of FIGS. 3 to 13 or operations thereof.

Embodiments as described may also be carried out in the form of a computer process defined by a computer program or portions thereof. Embodiments of the methods described in connection with FIGS. 3 to 13 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and soft-ware distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. A computerized method for pairing first and second devices and a user apparatus comprising:
   receiving, by the user apparatus, from the first device in a discoverable mode, an identifier of the first device;
   causing, by the user apparatus, sending an inquiry from the user apparatus to a database server, the inquiry comprising the identifier of the first device, and a username and a password of a user of the user apparatus;
   searching the database server for a username-password pair that matches the received username and password and retrieving, in response to a matching username-password pair being found, first and second codes associated with the received identifier of the first device;
   receiving, by the user apparatus, from the database server, in a response to the inquiry, the first and second codes for a pairing process;
   sending the first and second codes by the user apparatus to the first device;
   comparing the first and second codes with codes stored on the first device;
   establishing a pairing connection between the user apparatus and the first device in response to the first code being the same as one of the codes stored on the first device; and
   establishing a pairing connection between the user apparatus and the second device in response to the second code being the same as another of the codes stored on the first device.

2. The computerized method as claimed in claim 1, further comprising:
   receiving, by the user apparatus, from the database server, in the response to the inquiry two or more codes, each code being associated with an identifier of a corresponding first device;
   causing, by the user apparatus, performing, for each received code, the sending the code from the user apparatus to the corresponding first device during a two-way ad hoc connection pairing between the user apparatus and the corresponding first device.

3. The computerized method as claimed in claim 1, further comprising:
   receiving in the user apparatus a third code via a user interface;
   causing, by the user apparatus, sending the third code instead of the code received from the database server in the response to the first device from the user apparatus during the two-way ad hoc connection pairing between the user apparatus and the first device.

4. The computerized method as claimed in claim 1, wherein the first and second codes are PIN codes or passkeys for BLUETOOTH pairing.

5. A system comprising:
   one or more user apparatuses configured to send, in response to a user apparatus receiving an identifier of a first device from the first device in a discoverable mode, an inquiry from the user apparatus to a database server, the inquiry comprising the identifier and a username and a password of a user of the user apparatus, and to send, in response to receiving from the database server a code in a response to the inquiry, the code from the user apparatus to the first device during a two-way ad hoc connection pairing between the user apparatus and the first device;
   a database server configured to maintain in a memory username-password pairs and identifier-code pairs, to search, in response to a received inquiry from the user apparatus, the inquiry comprising an identifier, a username and a password, from the memory, a username-password pair that matches the received username and password, to retrieve, in response to a matching username-password pair being found, from the memory at least a code that is associated with the received identifier, and to send to the user apparatus at least the code in a response to the inquiry;

one or more communications networks between the user apparatus and the database server;

a local connection network;

one or more of the first device, each first device being configured to receive in a discoverable mode, over the local connection network, during the two-way ad hoc connection pairing, the code from the user apparatus, compare the received code with a code stored to the first device, and in response to the received code being the same as the stored code cause the two-way ad hoc connection pairing to be established to the user apparatus;

one or more second devices, each second device being configured to trust to the first device, the first device being configured to establish a connection via the first device between the user apparatus and the one or more second devices, wherein the first device is configured with at least two different codes, at least one of the codes indicating the one or more second devices, and the first device being configured to establish the connection between the user apparatus and the one or more second devices in response to another received code being the same as the at least one of the codes.

6. The system as claimed in claim 5, wherein the two-way ad hoc connection is a BLUETOOTH connection.

* * * * *